Patented June 29, 1943

2,323,284

UNITED STATES PATENT OFFICE 2,323,284

LUMINESCENT MATERIAL AND METHOD OF PREPARING THE SAME

William P. Toorks, Salem, Mass., assignor to Sylvania Electric Products Inc., a corporation of Massachusetts No Drawing. Application November 1, 1941, Serial No. 417,562

8 Claims. (Cl. 250—81)

This invention relates to luminescent materials and more particularly to those materials capable of emitting light ranging from yellow to green when excited by ultra-violet rays generated by a high pressure or low pressure mercury arc, or cathode rays.

An object of this invention is to obtain a luminescent material of high physical and chemical stability.

Another object is to obtain a luminescent material which will be highly efficient and which will maintain its efficiency during life.

Further objects, advantages, and features will be apparent from the following specification.

The fluorides of the alkaline earth metals and their mixtures, when activated by compounds of uranium, with or without fluxing agents, produce yellow to green fluorescent materials suitable for use in lighting display equipment or electronic devices emitting light excited by ultra-violet rays generated by a high pressure or low pressure mercury arc, or cathode rays.

The luminescent material may be produced by mixing the fluorides, singly or in combination, with uranium oxygen compounds or mixtures of uranium compounds. As was pointed out above, fluxing agents may or may not be used. Any of the well-known fluxing agents such as one of the alkali metal sulphates, fluorides, borates, phosphates etc., may be used. They may be mixed, singly or in combination, with or without the addition of the oxides of the earth metals such as calcium oxide, beryllium oxide etc., or oxide producing materials such as carbonates. They may be mixed with or without silicon-containing materials such as silica and silicic acid and heated in air or an oxidising atmosphere until the material is activated depending on the composition or the proposed use of the material.

The quantity of uranium in this type of material may be varied between approximately 0.03% and 4.0% by weight and the oxide additives, such as calcium oxide and silicic acid, may be added usually up to approximately 20% of the total weight and the fluxes up to several percent of the total weight. However, I have found that a highly desirable concentration is attained when the percentage of the oxide additives is in the vicinity of 10% by weight. On the other hand, I have found that in the case of calcium fluoride and calcium oxide mixtures, the oxide additives may be added up to nearly 100% and a luminescent material will still be obtained, although the decrease in brightness and efficiency of the material drops off as the amount of the oxide additives is increased over the range just illustrated.

A bright green fluorescent material of high physical and chemical stability may be obtained from calcium fluoride by this process. Either pure or technical grade calcium fluoride may be used. For example, approximately 600 grams of powdered technical calcium fluoride may be mixed dry in a pebble mill with approximately 0.14 gram of sodium uranate and 4.0 grams of uranyl nitrate. This mixture is formed into thin plates or discs which may be arranged in fire clay or alundum racks so that there is only very little if any contact between the separate plates. It is then fired in air at approximately 1200° C. for from one to six hours, to oxidize the material sufficiently to activate it.

However, the addition of an oxide, as mentioned above, enables the quick, complete, and thorough activation of the material. Not only is it possible to activate the material much quicker and more thoroughly but it is possible to thoroughly and completely activate masses of material whose thickness had previously rendered its complete activation a long, tedious and impractical process. When this oxide is not added the material must be formed into thin plates or discs for activation. By using my method and process, blocks of the material may be quickly activated.

Thus, for example, I mix about 90 grams of calcium fluoride and 10 grams of calcium oxide ground together with .7 gram of uranyl nitrate to form an intimate mixture of all the ingredients. There is no need to form this material into discs or plates for it may be fired in large trays and in large quantities. A highly satisfactory material may be obtained by firing this mixture at about 1200° C. for about an hour. The major advantage gained by adding an oxide as in this second example is that it eliminates the necessity for oxidizing the fluoride.

The most desired firing temperature depends on the alkaline earth used and the manner in which it is to be fired. When the material is fired in one of the more common commercial crucibles, it is desirable to keep the temperature comparatively low because the more common crucible materials, such as fire clay, are more rapidly attacked at higher temperatures. When the material is fired in one of these crucibles, I find that a range of about 900° C. to 1200° C. for barium and strontium to be effective. However, I find that when a material for example calcium fluoride, is fired below 1100° C. it must be fired for a considerably longer period of time in order to obtain the intensity of fluorescence which can be obtained at about 1150° C. On the other hand, if one fires the material in a graphite crucible in a high frequency induction furnace, the material may be melted down to a liquid and it will retain its fluorescence. This manner of firing enables one to fire at higher temperatures and in a shorter period of time.

To illustrate the relationship between firing time and firing temperature, I have found that when the material described in the second example cited above is fired at about 1180° C. for about one hour and three-quarters a product possessing desirable characteristics of brightness and efficiency is obtained. On the other hand, the same material may be fired at 1275° C. for 45 minutes with equally good results.

To obtain a product with a more yellow fluorescence and which fuses more easily than the straight calcium fluoride mixture, I substitute silica for a small amount of calcium fluoride.

Depending on the purity of the calcium fluoride used, the finished product will range in color from a white or cream to a dark brown or grayish color. I find that this dark color can be removed by leaching with acid, such as dilute hydrochloric acid, and a brighter, light-colored product is thereby obtained. For example, I have found that an unwashed sample of the material of example two is only about 53% as bright as a washed sample of this same material.

Thus the real value of this process and this material may be more readily appreciated. Commercial fluorspar or calcium fluoride containing considerable impurities may now be used and a high quality product with desirable characteristics may be obtained.

The fired, unwashed material may be defined in terms of the following formula:

$$(x)\,CaF_2.(y)\,CaO.(z)\,U_3O_8$$

where the molal proportions are from 1.00 to 1.14 for $x$, 0.25 to 0.06 for $y$, and 0.000038 to 0.0052 for $z$. These molal limits are independent of each other so that when the molal content of one of the elements is increased, it does not necessarily follow that all the others must be increased proportionately. Thus the amount of calcium fluoride present in the powder may be between 1.00 and 1.14 moles while the amount of calcium oxide may be between 0.25 and 0.06 mole and the uranyl oxide content may range between .000038 and .0052 mole.

The fired washed material, where some of the CaO may be removed by washing with a dilute acid, such as hydrochloric, gives a finished product which may be represented by the following formula:

$$(x)\,CaF_2.(a)\,CaO.(z)\,U_3O_8.(b)\,Ca$$
(acid radical used in the wash liquor)

where the sum of the quantities $a$ and $b$ is within the limits of $y$ or less, which is usually the case for on treating the material with acid some of the calcium oxide is dissolved out and converted to calcium chloride. During washing, unreacted calcium oxide is converted to calcium chloride if hydrochloric acid is used for washing. Other metallic impurities, such as iron, are converted to soluble chlorides and may filter off after the impurities and excess calcium oxide have been dissolved out. In this way, the amount of calcium oxide left in the material and the amount of calcium chloride included in the material may be less than the lower limit of $y$ because of their removal in the filtering operation.

Alkali fluorides may be prepared in substantially the same way except that the finished product is fused and contains from 0.003% to 0.4% uranium. For example, a material having a bright canary yellow fluorescence may be prepared by fusing 20 grams of sodium fluoride with 10 mg. of sodium uranate. This fused mass may be ground down to make a fluorescent pigment.

What I claim is:

1. The method of preparing a luminescent material comprising: mixing an alkaline earth fluoride, a uranium oxygen compound and an oxide of the earth metals; and firing the same.

2. A luminescent material comprising a mixture of an alkaline earth fluoride and an earth oxide, activated throughout its mass by a uranium-oxygen compound.

3. A luminescent material which may be represented by the general formula—

$$(x)\,CaF_2.(y)\,CaO.(z)\,U_3O_8$$

where the molal proportion may vary from 1.00 to 1.14 for $x$, 0.25 to 0.06 for $y$, and 0.000038 to 0.0052 for $z$.

4. A luminescent material which may be represented by the general formula—

$$(x)\,CaF_2.(a)\,CaO.(z)\,U_3O_8.(b)\,Ca$$
(dilute acid radical)

where the molal proportions may vary from 1.00 to 1.14 for $x$, 0.000038 to 0.0052 for $z$, and the sum of $a$ and $b$ not exceeding 0.25.

5. A luminescent material comprising a fired mixture of calcium fluoride, calcium oxide and silica, activated throughout its mass by a uranium oxygen compound.

6. A luminescent material comprising a mixture of an alkaline earth fluoride, an earth oxide and silica, activated throughout its mass by a uranium-oxygen compound.

7. The method of preparing a luminescent material, comprising: mixing an alkaline earth fluoride, a uranium oxygen compound, an oxide of the earth metals, and silica; and firing the same.

8. The method of preparing a luminescent material, said method comprising: mixing an impure alkaline earth fluoride, a uranium oxygen compound and an oxide of the earth metals; firing the same to produce a dark colored material; and then washing with dilute acid to produce a light colored material of improved luminescence.

WILLIAM P. TOORKS.

CERTIFICATE OF CORRECTION.

Patent No. 2,323,284. June 29, 1943.

WILLIAM P. TOORKS.

It is hereby certified that error appears in the printed specification of the above numbered patent requiring correction as follows: Page 2, second column, line 62, claim 8, after "luminescence." and before the signature of the inventor, insert the following claims -

--9. A luminescent material comprising a fired mixture of calcium fluoride and calcium oxide, activated throughout its mass by a uranium-oxygen compound.

10. A luminescent material as in claim 9, containing also calcium chloride.

11. A luminescent material as in claim 2, containing also a chloride of the earth metal.--;

and that the said Letters Patent should be read with this correction therein that the same may conform to the record of the case in the Patent Office.

Signed and sealed this 17th day of August, A. D. 1943.

(Seal)

Henry Van Arsdale,
Acting Commissioner of Patents.